United States Patent
Takaoka et al.

(10) Patent No.: US 11,072,909 B2
(45) Date of Patent: Jul. 27, 2021

(54) CAB COMING-OFF PREVENTION STRUCTURE OF WORKING MACHINE

(71) Applicant: Caterpillar SARL, Geneva (CH)

(72) Inventors: Tetsuji Takaoka, Akashi (JP); Ryosuke Ono, Akashi (JP)

(73) Assignee: Caterpillar SARL, Geneva (CH)

( * ) Notice: Subject to any disclaimer, the term of this patent is extended or adjusted under 35 U.S.C. 154(b) by 106 days.

(21) Appl. No.: 16/604,101

(22) PCT Filed: Apr. 13, 2018

(86) PCT No.: PCT/EP2018/000201
§ 371 (c)(1),
(2) Date: Oct. 9, 2019

(87) PCT Pub. No.: WO2018/188805
PCT Pub. Date: Oct. 18, 2018

(65) Prior Publication Data
US 2020/0248431 A1 Aug. 6, 2020

(30) Foreign Application Priority Data
Apr. 14, 2017 (JP) .............................. JP2017-080725

(51) Int. Cl.
*E02F 9/16* (2006.01)
*B62D 33/06* (2006.01)
*E02F 9/08* (2006.01)

(52) U.S. Cl.
CPC .............. *E02F 9/163* (2013.01); *E02F 9/166* (2013.01); *B60Y 2200/412* (2013.01);
(Continued)

(58) Field of Classification Search
CPC ......... E02F 9/163; E02F 9/166; E02F 9/0808; E02F 9/16; B60Y 2200/412; B62D 33/0617; E05Y 2900/518
(Continued)

(56) References Cited

U.S. PATENT DOCUMENTS 8,091,954 B2 * 1/2012 Blin ................... B62D 33/0604
296/190.01
2004/0245806 A1 * 12/2004 Mori ................... B62D 33/0604
296/187.03
(Continued)

FOREIGN PATENT DOCUMENTS

| FR | 2909396 A1 | 6/2008 |
| JP | 56172081 U | 12/1981 |
| JP | 2010048026 A | 3/2010 |

OTHER PUBLICATIONS

International Search Report for related International Application No. PCT/EP2018/000201 report dated Aug. 7, 2018.

*Primary Examiner* — D Glenn Dayoan
*Assistant Examiner* — E Turner Hicks

(57) ABSTRACT

To provide a cab coming-off prevention structure of a working machine capable of preventing a coming-off prevention device from falling off.
One end side of a stopper shaft portion 51 of a coming-off prevention device 16 is inserted through a through-hole 37a. The other end side of the stopper shaft portion 51 is inserted through an insertion hole 23b. A stopper main body portion 52 is provided on the other end of the stopper shaft portion 51. A portion of the key member 53 is fitted into a notched portion 51c provided along a direction crossing an axial direction of one end side the stopper shaft portion 51. The other part of the key member 53 protruding from the stopper shaft portion 51 is fixed to the one of the cab 14 and the revolving frame 23. Even if the key member 53 is discon-
(Continued)

nected from the cab 14 or the revolving frame 23, the coming-off prevention device 16 can be prevented from falling off, without the stopper shaft portion 51 coming off the through-hole 37*a*, because a portion of the key member 53 is fitted into the notched portion 51*c* of the stopper shaft portion 51.

3 Claims, 5 Drawing Sheets

(52) U.S. Cl.
CPC ........ *B62D 33/0617* (2013.01); *E02F 9/0808* (2013.01); *E05Y 2900/518* (2013.01)

(58) Field of Classification Search
USPC .................. 296/190.08, 190.04, 35.1, 190.06
See application file for complete search history.

(56) References Cited

U.S. PATENT DOCUMENTS

| | | | |
|---|---|---|---|
| 2006/0071499 A1* | 4/2006 | Yoon | B62D 33/0604 296/35.1 |
| 2009/0167057 A1* | 7/2009 | Walter | B62D 55/0655 296/190.03 |
| 2009/0289472 A1* | 11/2009 | Catanzarite | B62D 33/0604 296/190.07 |
| 2010/0048026 A1 | 2/2010 | Sone et al. | |
| 2010/0320802 A1* | 12/2010 | Miyasaka | E02F 9/166 296/190.03 |
| 2011/0025097 A1* | 2/2011 | Yamamoto | B62D 33/0617 296/190.03 |

* cited by examiner

CAB COMING-OFF PREVENTION STRUCTURE OF WORKING MACHINE

CROSS-REFERENCE TO RELATED APPLICATION

This Application is a 35 USC § 371 US National Stage filing of International Application No. PC T/EP2018/000, 201 filed on Apr. 13, 2018 which claims priority under the Paris Convention to Japanese Patent Application No. 2017-080,725 filed on Apr. 14, 2017.

TECHNICAL FIELD

The present invention relates to a cab coming-off prevention structure of a working machine in which the cab is prevented from coming off via a coming-off prevention device with respect to a machine body frame.

BACKGROUNHD ART

Conventionally, as a technique for preventing falling off of a driver's cabin or cab from a machine body frame due to a lateral load at the time of overturn of a working machine such as a hydraulic excavator, there is a technique for providing a coming-off prevention device in the vicinity of a cab mount that elastically supports the cab. This coming-off prevention device comprises a rod-shaped member provided in a protruding manner downwardly from the bottom frame of the cab, and a regulating body provided at a lower end which is a tip of this rod-like member. Then, the rod-shaped member is arranged so as to be inserted through a hole portion provided in the machine body frame (upper revolving body frame), and an outer shape of the regulating body at the lower end of the rod-like member inserted through the hole portion is provided so as to be larger than an inner shape of the hole portion, whereby, for example, when the cab is subjected to displacement exceeding a movable range of the cab mount, displacement greater than the load that can be absorbed by the cab mount, or load, the coming-off prevention device acts to prevent the cab from falling off from the machine body frame (see Patent Literature 1, for example).

PRIOR ART DOCUMENTS

Patent Documents

PATENT DOCUMENT 1: Japanese Patent Application Laid-Open 2010-48026

SUMMARY OF THE INVENTION

Problems to be Solved by the Invention

The rod-shaped member is configured so that its upper end is fixed by welding, to the bottom frame of the cab. Therefore, it is necessary to prevent the rod-shaped member from falling off during the action of the coming-off prevention device due to cracking of the welded portion when a load exceeding the load-bearing capacity is applied.

The present invention has been made in view of these circumstances, and it is directed to provide a cab coming-off prevention structure of a working machine capable of preventing a coming-off prevention device from falling off.

Means for Solving the Problems

The invention according to claim 1 is a cab coming-off prevention structure of a working machine in which a cab is prevented from coming off via a coming-off prevention device with respect to a machine body frame, wherein the cab includes a bottom frame opposed to the machine body frame, the one of the bottom frame and the machine body frame includes a through-hole, and the other includes an insertion hole at a position corresponding to the through-hole, the coming-off prevention device comprises a shaft-shaped stopper shaft portion in which a notched portion provided along a direction crossing an axial direction is included at one end side, the one end side is inserted through the through-hole, and the other end side is inserted through the insertion hole, a regulating body provided at the other end of the stopper shaft portion inserted through the insertion hole, and having at least a portion of an outer shape being larger than an inner shape of the insertion hole, and a key member in which, in a state where one portion is fitted into the notched portion with respect to the stopper shaft portion inserted through the through-hole, the other portion protruding from the stopper shaft portion is fixed to the one of the cab and the machine body frame.

The invention according to claim 2 is characterized in that the through-hole in the cab coming-off prevention structure of the working machine according to claim 1 is provided in the bottom frame, the insertion hole is provided in the machine body frame, and the other portion of the key member protruding from the stopper shaft portion is fixed to the cab.

The invention according to claim 3 is characterized in that the cab in the cab coming-off prevention structure of the working machine according to claim 2 comprises a vertical frame rising up with respect to the bottom frame, and the key member is fixed to the bottom frame and the vertical frame.

Favorable Effects of the Invention

According to the invention in claim 1, one end side of the stopper shaft portion of the coming-off prevention device is inserted through the through-hole, the other end side of the stopper shaft portion is inserted through the insertion hole, and the regulating body is provided at the other end of the stopper shaft portion, and a portion of the key member is fitted into the notched portion provided along a direction crossing the axial direction of one end side of the stopper shaft portion, and the other portion of the key member protruding from the stopper shaft portion is fixed to the one of the cab and the machine body frame, whereby, even if the key member is temporarily detached from the cab or the machine body frame, the stopper shaft portion never comes off the through-hole and the coming-off prevention device can be prevented from falling off, because a portion of the key member is fitted into the notched portion of the stopper shaft portion.

According to the invention in claim 2, the through-hole is provided in the bottom frame, the insertion hole is provided in the machine body frame, and the other part of the key member protruding from the stopper shaft portion is fixed to the cab, whereby enabling the cab to be reinforced by the key member.

According to the invention in claim 3, the key member is fixed to the bottom frame and the vertical frame with respect to the cab, and thereby the cab can be more effectively reinforced by the key member.

DETAILED DESCRIPTION OF EMBODIMENTS OF THE INVENTION

Hereinbelow, the present invention will be described based on an embodiment illustrated in FIG. 1 to FIG. 5.

Figure 5:
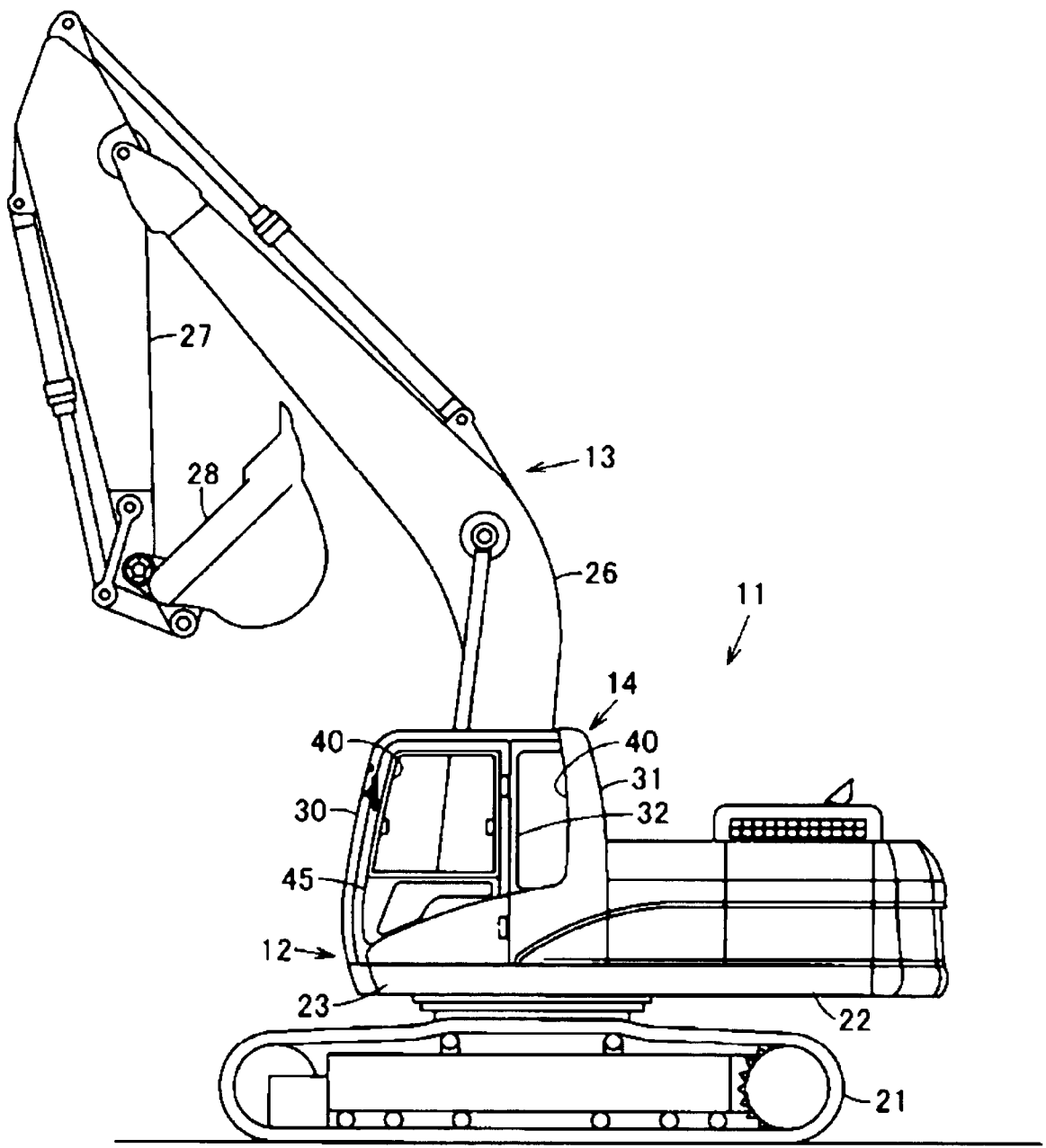
FIG. 5 is a side sectional view showing the same working machine as above.

In FIG. 5, 11 denotes a working machine, and in the present embodiment, this working machine 11 is, for example, a hydraulic excavator type working machine.

The working machine 11 includes a machine body 12. Further, this working machine 11 is provided with a working device 13 operably protruded from the machine body 12. Further, this working machine 11 is provided with a cab 14 which is a driver's cabin provided on the machine body 12. Further, this working machine 11 is provided with a mount device 15 (FIG. 2) for vibration-proof of the cab 14. And this working machine 11 is provided with a coming-off prevention device 16 (FIG. 1) provided in the cab 14.

Figure 2:
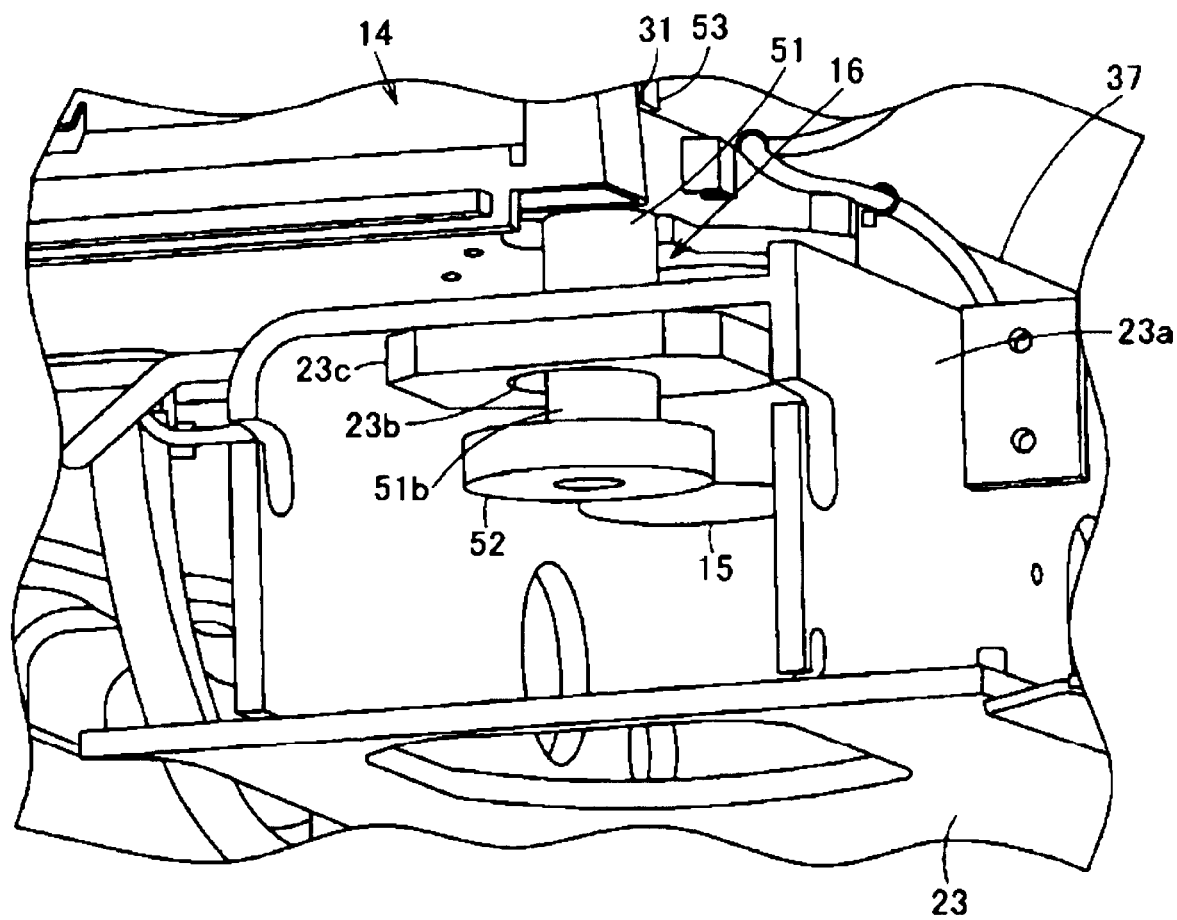
FIG. 2 is a perspective view showing from the lower part of the same cab coming-off prevention structure of the working machine as above.
Figure 3:
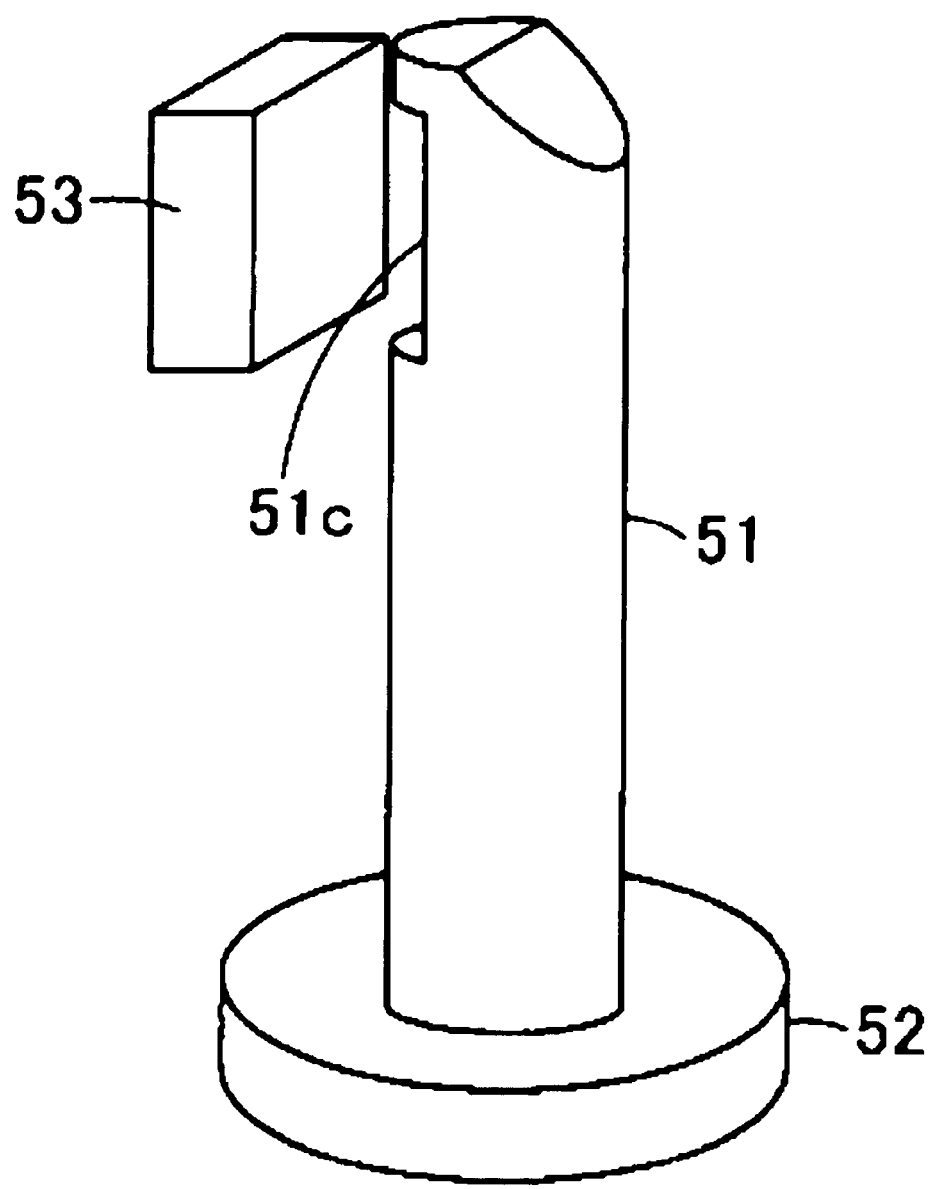
FIG. 3 is an exploded perspective view of a coming-off prevention device of the same cab coming-off prevention structure of the working machine as above.

The machine body 12 is provided with a crawler type lower traveling body 21 and an upper revolving body 22 revolvably provided on the lower traveling body 21. The machine body 12 is provided with a revolving frame (upper revolving body frame) 23 serving as a machine body frame constituting the upper revolving body (superstructure) 22. The revolving frame 23 includes an installing portion 23a (FIG. 2). The revolving frame 23 may include a revolving bearing portion for revolvably installing the revolving frame 23 to the lower traveling body 21.

The installing portion 23a shown in FIG. 2 is a mount installing portion to which a mount device 15 is installed. The installing portion 23a is provided in protruding manner in a box shape on the upper part of the revolving frame 23 opposed to the lower part of the cab 14. The installing portions 23a are disposed, for example, along the left-right direction at the front lower part and the rear lower part of the cab 14, respectively. The installing portion 23a is provided with an insertion hole 23b through which a portion of the coming-off prevention device 16 as described below is inserted. The insertion hole 23b is formed, for example in a circular hole shape, and is provided so as to penetrate the installing portion 23a (the revolving frame 23) in a vertical direction (thickness direction). The insertion hole 23b is disposed, for example, in the lower part of the rear part of the cab 14. In the present embodiment, the insertion hole 23b is arranged at the lower part of the left rear part which is one side of the cab 14. That is, the insertion hole 23b is disposed in the installing portion 23a on the rear side. A reinforcing member 23c may be attached around the insertion hole 23b. The reinforcing member 23c is provided, for example, in a cylindrical shape and is integrally fixed to the lower part of the installing portion 23a by, for example, welding.

Returning to FIG. 5, the working device 13 is constituted by a boom 26 operated by a hydraulic cylinder, an arm 27, and an attachment 28 such as a bucket.

Figure 4:
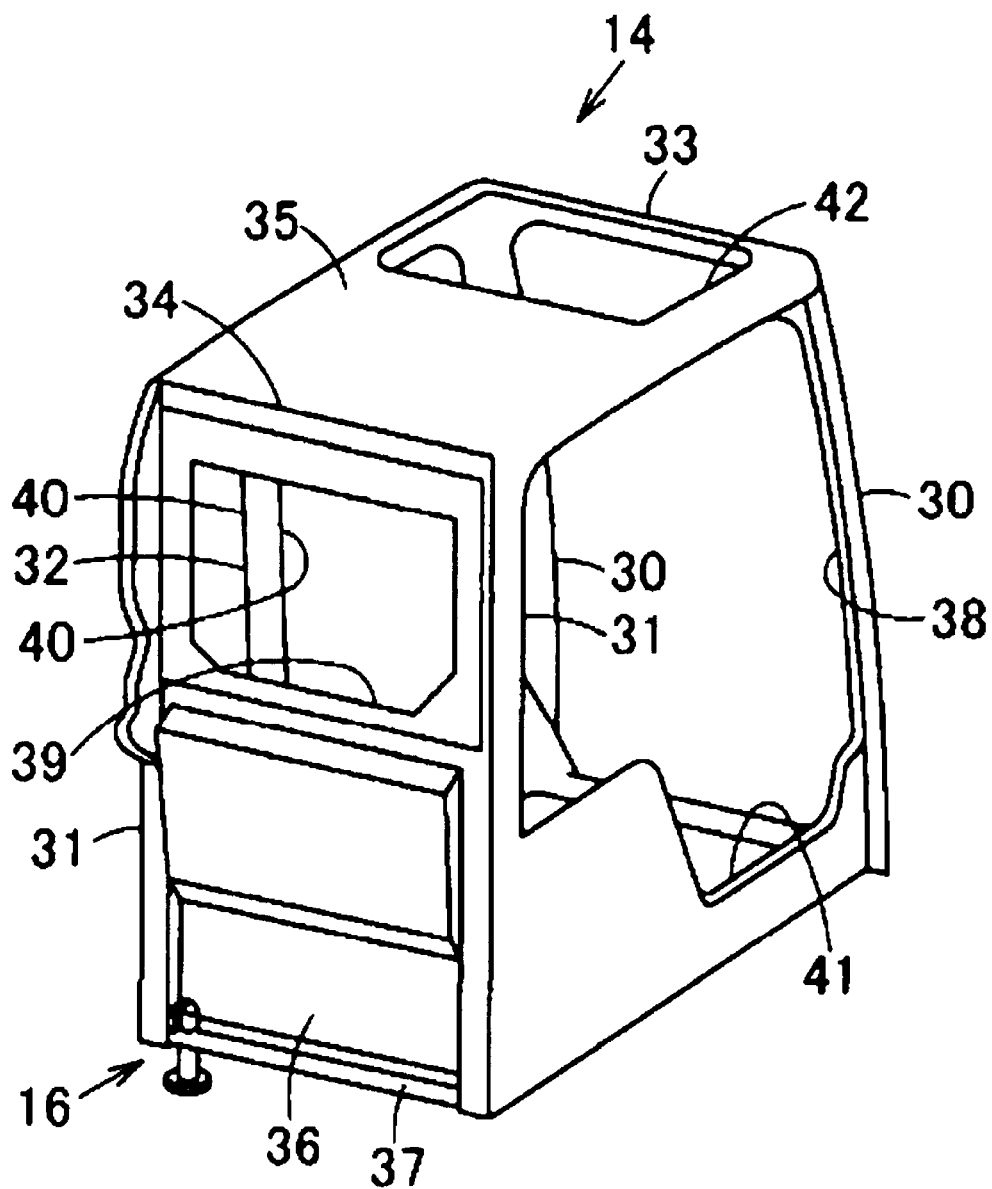
FIG. 4 is a perspective view showing a cab and a coming-off prevention device of the same working machine as above.

The cab 14 shown in FIG. 4 and FIG. 5 protects an operator operating the machine body 12 and the working device 13. The cab 14 is provided on one side, for example, on the left side in the left-right direction of the front part of the machine body 12. In other words, the cab 14 is arranged to be located on the side of the working device 13 and the revolving frame 23. The cab 14 is provided in a box shape. That is, the cab 14 has front pillars 30, 30. The cab 14 also has rear pillars 31, 31 as vertical frames. Furthermore, the cab 14 has a center pillar 32. The cab 14 also has a front head part 33. Furthermore, The cab 14 has a rear head part 34. The cab 14 also has a ceiling panel 35. Furthermore, the cab 14 has a rear panel 36. The cab 14 also has a bottom frame 37. The cab 14 also has a front window 38. Furthermore, the cab 14 has a rear window 39. The cab 14 also has side windows 40, 41. Furthermore, the cab 14 may have a skylight 42. Inside the cab 14, though not shown, a driver's seat on which the operator is seated, an operating lever operated by the operator, an operating pedal, a monitor, and the like, are arranged, respectively.

The front pillars 30, 30 are located from the front part to the ceiling part of the cab 14 and are disposed on the left and right parts, respectively. These front pillars 30, 30 may be made of, for example, deformed steel pipes.

The rear pillars 31, 31 are located on the rear part of the cab 14 and are arranged on the left and right parts, respectively. The rear end parts of the front pillars 30, 30 are connected to the upper end parts of the rear pillars 31, 31.

The center pillar 32 is located on the left side which is one side part of the cab 14, that is, on the opposite side to the working device 13. The center pillar 32 is positioned between the front pillar 30 and the rear pillar 31, and its upper end part is connected to the front pillar 30. Between the front pillar 30 and the center pillar 32, there is provided a door 45 that opens and closes when the operator gets on and off.

The front head part 33 is located along the left-right direction and is used to connect between upper parts of the front pillars 30, 30 at the front part of the cab 14.

The rear head part 34 is located along the left-right direction and is used to connect between upper parts of the rear pillars 31, 31.

The ceiling panel 35 is arranged between the front pillars 30, 30 and the rear pillars 31, 31 at the ceiling part of the cab 14.

The rear panel 36 is arranged below the rear window 39 between the rear pillars 31 and 31.

Figure 1:
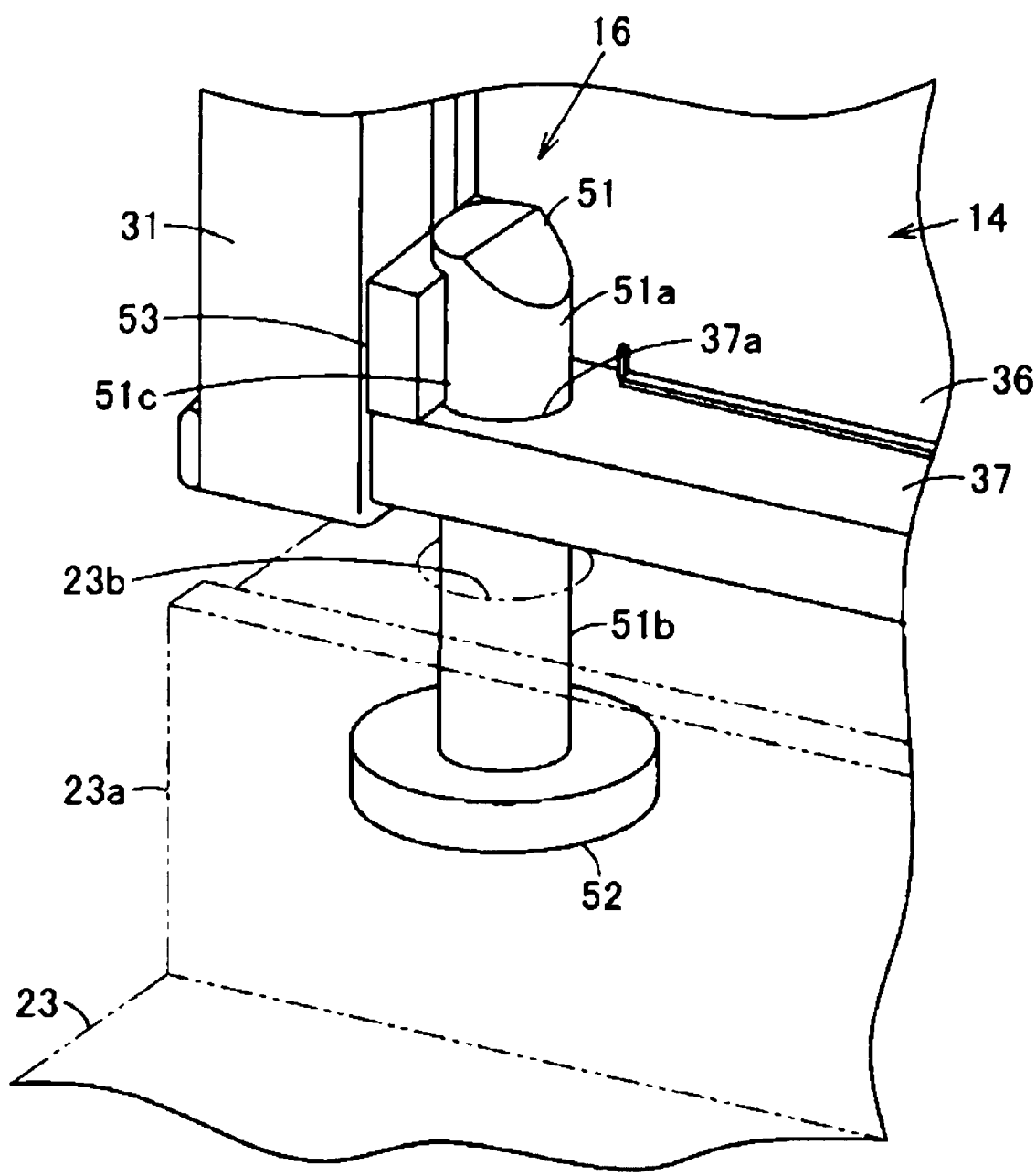
FIG. 1 is an enlarged perspective view in which the main part illustrating an embodiment of a cab coming-off prevention structure of a working machine according to the present invention.

The bottom frame 37 shown in FIG. 1, FIG. 2, and FIG. 4 constitutes a part of the bottom surface of the cab 14. Therefore, the bottom frame 37 is disposed so as to be opposed to the revolving frame 23 (the installing portion 23a) at a position separated above the revolving frame 23 (the installing portion 23a). The bottom frame 37 is disposed, for example in the present embodiment, closer to the rear part of the cab 14. Therefore, in the present embodiment, the bottom frame 37 is disposed so as to be opposed above the installing portion 23a on the rear side. The rear pillars 31, 31 are raised on both left and right sides of the bottom frame 37. Further, in this bottom frame 37, a rear panel 36 is raised between the rear pillars 31, 31. With respect to the bottom frame 37, the rear pillars 31, 31 and the rear panel 36 stand up, for example vertically upwardly. The rear pillars 31, 31 are arranged on both sides of the rear part of the bottom frame 37. Further, the rear panel 36 is arranged between the rear pillars 31, 31 slightly forward of the rear end part of the bottom frame 37. Therefore, both side parts of the rear part and two sides of the lower part of the cab 14 are constituted by the rear pillars 31, 31 and the bottom frame 37. That is, each rear pillar 31 and the bottom frame 37 are arranged so as to form L-character respectively when viewed from behind. Further, the through-hole 37a is provided in the bottom frame 37. The through-hole 37a is formed, for example in a circular hole shape, and is provided so as to penetrate the bottom frame 37 in the vertical direction (thickness direction). In addition, the through-hole 37a is each provided adjacent to at least one rear pillar 31. In the present embodiment, this through-hole 37a is disposed adjacent to the right side (the right rear pillar 31 side which is the other side) of the rear pillar 31 on left side which is one side.

In addition, the through-hole 37a is disposed behind the rear panel 36. Further, the through-hole 37a is disposed at a position corresponding to the insertion hole 23b provided in the revolving frame 23 (the installing section 23a). Further, the through-hole 37a is disposed at a position corresponding to the insertion hole 23b provided in the revolving frame 23 (the installing portion 23a). Therefore, the through-hole 37a and the insertion hole 23b are arranged opposed up and down to each other. That is, the through-hole 37a and the insertion hole 23b are arranged coaxially each other on an axis along the vertical up-down direction. In the present embodiment, the through-hole 37a is provided in the bottom frame 37 and the insertion hole 23b is provided in the revolving frame 23 (the installing section 23a). However, the through-hole 37a may be provided in the revolving frame 23 (the installing section 23a) and the insertion hole 23b may be provided in the bottom frame 37.

The front window 38 shown in FIG. 4 is located at the front face of the cab 14, surrounded by the front pillars 30, 30 and the front head part 33.

The rear window 39 is located at the rear face of the cab 14, surrounded by the rear pillars 31, 31, the ceiling panel 35, and the rear panel 36.

The side window 40 is located at the left side surface of the cab 14, surrounded between the front pillar 30 and the center pillar 32, and between the center pillar 32 and the front pillar 30 and the rear pillar 31. That is, the side window 40 is provided partially in the door 45.

The side window 41 is located at the right-side surface of the cab 14, surrounded by the front pillar 30 and the rear pillar 31. The side window 41 is positioned opposed to the working device 13 (boom 26).

The skylight 42 is disposed at the front part of the ceiling panel 35 in the ceiling part of the cab 14. The skylight 42 is adjacent to the front window 38 via the front head part 33. The skylight 42 may be provided so as to be openable and closable.

The mount device 15 shown in FIG. 2 elastically supports the cab 14. For example, the mount devices 15 are respectively disposed at the lower parts of the four corners of the cab 14. Each mount device 15 is fixed to the installing section 23a of the revolving frame 23. Each mount device 15 has a coupling section (not shown) to be coupled to the lower part of the cab 14 by a fastening means such as a bolt (not shown). The coupling section is constituted to be held by a vibration absorbing means for example such as antivibration rubber.

The coming-off prevention device 16 shown in FIG. 1 to FIG. 4 is a stopper for protecting the driver's cabin, configured to prevent the cab 14 from coming off with respect to the revolving frame 23 against a lateral load acting when the working machine 11 (FIG. 5) is overturned, for example. This coming-off prevention device 16 includes a shaft-shaped stopper shaft portion 51. Further, this coming-off prevention device 16 is provided with a stopper main body portion 52 which is a regulating body. Furthermore, this coming-off prevention device 16 includes a key member 53. And this coming-off prevention device 16 is positioned, for example at the lower part of the rear part of the cab 14. In the present embodiment, this coming-off prevention device 16 is positioned at the lower part of the left rear part which is one side of the cab 14.

The stopper shaft portion 51 is, for example, a rod-shaped member provided in a cylindrical shape having an outer diameter dimension substantially equal to an inner diameter dimension of the through-hole 37a. The stopper shaft portion 51 is arranged along the up-and-down (vertical) direction. The stopper shaft portion 51 is constituted so that the upper end side which is one end side is inserted from the lower side through the through-hole 37a of the cab 14 and forms an upper side protruding portion 51a protruding upwardly with respect to the bottom frame 37. The stopper shaft portion 51 is also constituted so that the lower end side which is the other end side is inserted from the upper side through the insertion hole 23b of the revolving frame 23 and forms a lower side protruding portion 51b protruding downwardly with respect to the installing portion 23a. Furthermore, the stopper shaft portion 51 includes a notched portion 51c in the upper end side, that is, the upper side protruding portion 51a. The notched portion 51c is provided along a direction crossing (orthogonal) to an axial direction (longitudinal direction) of the stopper shaft portion 51. Specifically, the notched portion 51c is provided so that one side of the stopper shaft portion 51 that faces the rear pillar 31 is notched. In the present embodiment, the notched portion 51c is a recessed portion (notched groove portion) provided so that the left side facing the rear pillar 31 on the left side is notched in a U-shape as seen in a front-rear direction. In addition, the notched portion 51c is located above the bottom frame 37.

A stopper main body portion 52 is provided at the lower end of the stopper shaft portion 51 inserted through the insertion hole 23b. The stopper main body portion 52 is integrally fixed to the lower end of the stopper shaft portion 51 by, for example, bolt fastening. The stopper main body portion 52 is provided so that at least a part of the outer shape thereof is larger than the inner shape of the insertion hole 23b. In the present embodiment, the stopper main body portion 52 is provided, for example, in the form of a disk having an outer diameter dimension larger than the stopper shaft portion 51. In other words, the stopper main body portion 52 has an outer diameter dimension larger than the inner diameter dimension of the insertion hole 23b. Further, the stopper main body portion 52 may be arranged such that, for example, its center axis is deviated relative to the stopper shaft portion 51.

The key member 53 is used to fix the coming-off prevention device 16 to the cab 14. The key member 53 is constituted such that the other part is fixed to the cab 14, in a state where one part of the key member 53 is fitted into the notched portion 51c with respect to the stopper shaft portion 51 inserted through the through-hole 37a. That is, the key member 53 is disposed so as to be superimposed on the top of the bottom frame 37. Further, the key member 53 is provided, for example in the shape of a rectangular parallelepiped block. The key member 53 is fitted into the stopper shaft portion 51 at the position of the notched portion 51c and the opposite side to the notched portion 51c protrudes outwardly from the outer shape of the stopper shaft portion 51. In the present embodiment, the right side of the key member 53 is fitted into the notched portion 51c and the left side protrudes to the left side of the stopper shaft portion 51 with respect to the outer shape of the stopper shaft portion 51. Further, the key member 53 may be fixed to the stopper shaft portion 51 by welding or the like at the position of the notched portion 51c. Further, the key member 53 is fixed such that other portion protruding from the notched portion 51c of the stopper shaft portion 51 is welded and fixed to the rear pillar 31 and the bottom frame 37, respectively. That is, in the present embodiment, the key member 53 is welded such that the left side part protruding from the stopper shaft portion 51 is welded to rear pillar 31 on the left side and the top of the bottom frame 37 at the side part and the lower part, respectively. Therefore, this key member 53 is welded to the corner portion of the cab 14. In the present embodiment, this key member 53 is welded to the rear left corner of the cab 14. In other words, the key member 53 is welded across two orthogonal sides (the left side and the lower side) constituting the cab 14. Further, the key member 53 closes a part of the through-hole 37a in a state of being welded to the bottom frame 37.

Next, the action of the illustrated embodiment will be described.

The coming-off prevention device 16 is configured so that in an event that the cab 14 moves upwardly or otherwise relative to the revolving frame 23, when the cab 14 is subjected to displacement exceeding a movable range of the mount device 15, displacement greater than the load that can be absorbed by the mount device 15, or load, the stopper main body portion 52 is caught by the periphery of the insertion hole 23b (the installing portion 23a), and thereby the cab 14 is prevented from dropping from the revolving frame 23, because the outer shape of the stopper main body portion 52 is larger than the inner shape of the insertion hole 23b.

Even if a crack is caused by the application of a load exceeding the load bearing capacity, and thereby the key member 53 is disengaged from the cab 14, the stopper shaft portion 51 is locked to the key member 53 caught by the through-hole 37a, because a part of the key member 53 is fitted into the notched portion 51c of the stopper shaft portion 51, and thereby the stopper shaft portion 51 never comes off the through-hole 37.

That is, according to the afore-mentioned one embodiment, one end side of the stopper shaft portion 51 of the coming-off prevention device 16 is inserted through the through-hole 37a, the other end side of the stopper shaft portion 51 is inserted through the insertion hole 23b, and the stopper main body portion 52 is provided at the other end of the stopper shaft portion 51, and a part of the key member 53 is fitted into the notched portion 51c provided along the direction crossing the axial direction of one end side of the stopper shaft portion 51, the other part of the key member 53 protruding from the shaft portion 51 is fixed to the cab 14 or the revolving frame 23, thereby, even if the key member 53 is detached from the cab 14 or the revolving frame 23, the stopping shaft portion 51 never come off the through-hole 37a, because a part of the key member 53 is fitted into the notched portion 51c of the stopper shaft portion 51, and accordingly the coming-off prevention device 16 can be prevented from falling off with respect to the cab 14 or the revolving frame 23. Therefore, the cab 14 can be prevented from coming off more reliably by the coming-off prevention device 16 with respect to the revolving frame 23, thereby improving the reliability of the working machine 11.

Further, in the present embodiment, the through-hole 37a is provided in the bottom frame 37, the insertion hole 23b is provided in the revolving frame 23, and the other portion protruding from the stopper shaft portion 51 of the key member 53 is fixed to the cab 14, thereby enabling the cab 14 to be reinforced by the key member 53.

Specifically, by fixing the key member 53 to the bottom frame 37 and the rear pillar 31 with respect to the cab 14, the corner portions of two sides of the cab frame will be reinforced by the key member 53, and the key member 53 acts as a gusset, and thus the cab 14 can be more effectively reinforced by the key member 53. Therefore, it is possible to make the cab 14 harder to deform even when a lateral load is applied to it.

In the above embodiment, the key member 53 may be welded to the rear panel 36, for example as a vertical frame rising up with respect to the bottom frame 37.

Also, the coming-off prevention device 16 may be arranged not only at one side of the rear part of the cab 14, but also at the front part, a plurality of parts, or other parts.

Further, although the notched portion 51c is a recessed portion formed by notching one side of the stopper shaft portion 51, it may also be, for example a notched portion penetrating the stopper shaft portion 51.

The present invention has industrial applicability for business operators engaged in the manufacturing business, sales business, etc. of working machines such as hydraulic excavators.

REFERENCE SIGNS LIST 11 working machine
14 cab
16 coming-off prevention device
23 revolving frame serving as machine body frame
23b insertion hole
31 rear pillar as vertical frame
37 bottom frame
37a through-hole
51 stopper shaft portion
51c notched portion
52 stopper main body portion serving as regulating body
53 key member

The invention claimed is:
1. A cab coming-off prevention structure of a working machine in which a cab is prevented from coming off via a coming-off prevention device with respect to a machine body frame, is characterized in that,
   the cab includes a bottom frame opposed to a machine body frame, and
   the one of the bottom frame and the machine body frame includes a through-hole, and the other one includes an insertion hole at a position corresponding to the through-hole,
   the coming-off prevention device comprises,
   a shaft-shaped stopper shaft portion in which a notched portion provided along a direction crossing an axial direction is included at one end side, the one end side is inserted through the through-hole, and the other end side is inserted through the insertion hole,
   a regulating body provided at the other end of the stopper shaft portion inserted through the insertion hole, and having at least a portion of an outer shape being larger than an inner shape of the insertion hole, and
   a key member in which, in a state where one portion is fitted into the notched portion with respect to the stopper shaft portion inserted through the through-hole, the other portion protruding from the stopper shaft portion is fixed to the one of the cab and the machine body frame.

2. The cab coming-off prevention structure of working machine according to claim 1,
   wherein the through-hole is provided in the bottom frame, and the insertion hole is provided in the machine body frame,
   the key member in which the other part protruding from the stopper shaft portion is fixed to the cab.

3. The cab coming-off prevention structure of working machine according to claim 2,
   wherein the cab includes a vertical frame that stands up with respect to the bottom frame, and
   the key member is fixed to the bottom frame and the vertical frame.

* * * * *